(12) United States Patent
Nath et al.

(10) Patent No.: US 7,991,427 B2
(45) Date of Patent: Aug. 2, 2011

(54) SYSTEM AND METHOD TO PROVIDE APPLICATION MANAGEMENT ON WIRELESS DATA TERMINALS BY MEANS OF DEVICE MANAGEMENT AGENT AND DYNAMIC LINK LIBRARIES

(75) Inventors: Badri Nath, Edison, NJ (US); Srinivas Devarakonda, Keasbey, NJ (US); Rakesh Kushwaha, Marlboro, NJ (US)

(73) Assignee: MFormation Technologies, Inc., Edison, NJ (US)

( * ) Notice: Subject to any disclaimer, the term of this patent is extended or adjusted under 35 U.S.C. 154(b) by 862 days.

(21) Appl. No.: 11/898,420

(22) Filed: Sep. 12, 2007

(65) Prior Publication Data

US 2008/0064383 A1   Mar. 13, 2008

Related U.S. Application Data

(60) Provisional application No. 60/844,092, filed on Sep. 13, 2006.

(51) Int. Cl.
 *H04M 1/00* (2006.01)
 *G06F 9/44* (2006.01)

(52) U.S. Cl. ..................................... 455/552.1; 717/173

(58) Field of Classification Search .................. 713/176; 709/221; 717/173; 455/418; 726/26, 30
See application file for complete search history.

(56) References Cited

U.S. PATENT DOCUMENTS

| | | | | |
|---|---|---|---|---|
| 6,493,751 | B1 * | 12/2002 | Tate et al. | 709/221 |
| 7,123,933 | B2 * | 10/2006 | Poor et al. | 455/552.1 |
| 7,752,618 | B2 * | 7/2010 | Moles et al. | 717/173 |
| 2002/0180798 | A1 * | 12/2002 | Poor et al. | |
| 2002/0183051 | A1 * | 12/2002 | Poor et al. | |
| 2004/0111723 | A1 * | 6/2004 | Moles et al. | |
| 2004/0133887 | A1 * | 7/2004 | Herle et al. | |
| 2007/0204165 | A1 * | 8/2007 | Lytle et al. | 713/176 |

OTHER PUBLICATIONS

International Search Report and a Written Opinion of the International Searching Authority, in PCT/US 07/19818 dated Apr. 9, 2008.*

* cited by examiner

*Primary Examiner* — Charles N Appiah
*Assistant Examiner* — Kiet Doan
(74) *Attorney, Agent, or Firm* — Murphy & King, P.C.

(57) ABSTRACT

The present invention relates to a system and method of remote application management on wireless data terminals using a device management agent and dynamic link libraries provided by the application. Third party applications on a wireless device can communicate and be controlled by a remote management server via a management client plug-in interface.

24 Claims, 5 Drawing Sheets

SYSTEM AND METHOD TO PROVIDE APPLICATION MANAGEMENT ON WIRELESS DATA TERMINALS BY MEANS OF DEVICE MANAGEMENT AGENT AND DYNAMIC LINK LIBRARIES

CROSS-REFERENCE TO RELATED APPLICATIONS

This application claims the benefit of provisional application No. 60/844,092, filed Sep. 13, 2006, the entirety of which is incorporated herein by reference.

FIELD OF THE INVENTION

The present invention relates to a system and method of remote application management on wireless data terminals using a device management agent and dynamic link libraries provided by the application. Third party applications on a wireless device can communicate and be controlled via a management client plug-in interface.

BACKGROUND OF THE INVENTION

In today's market there are many applications that could add value to a wireless device. These applications include security programs, multimedia display programs, interactive entertainment programs, enterprise applications, and financial applications, just to name a few. Once installed, in order to be used effectively these applications have to be configured remotely or locally, and in some instances, run at certain times or with various inputs. Unfortunately, users cannot be counted on to run these programs consistently, problems can arise with local configuration, and these applications were not designed for remote management over a wireless link and lack the interface logic to communicate over-the-air.

Conventional applications can be run and configured from the user interface. Any application on a desktop computing device or a mobile device provides a user interface such as an options tab or configuration tabs that allow the user to set parameters that change the default behavior of the application. Allowing the user to change the configuration of applications, while convenient, is beset with problems, particularly for mobile devices. Manual changes are error prone, and applications that are mis-configured by the user require costly intervention by customer service help or IT help desk personnel. Additionally, when a user changes the settings it will not be possible to ensure that the application behavior on all devices conforms to a set policy, or to guarantee that the programs will be run appropriately once they are installed and configured. Furthermore, by their very nature mobile devices travel with users and when a mis-configuration or error occurs the device may not be near any help desk or IT personnel who can physically come and set the correct configurations.

Hence, there is a need to allow remote management of applications by an authorized server, including starting an application, stopping an application, invoking a command provided by the application, and configuring an application. Remote application management allows service providers and enterprises to set policies for the behavior of applications. A management server can control application behavior according to policy files or configuration files. The capability of modifying application behavior from a remote authorized server enables automatic policy-based application settings on all or a portion of wireless devices. This avoids errors, policy violations, and/or mis-configurations that are bound to happen during a manual configuration.

Dynamic link libraries (DLL) have been used to extend the functionality of applications. Dynamic link libraries offer a mechanism by which application functionality can be changed without having to change the application itself. Further, a shared DLL can be used by several applications without having to include the library in each application.

SUMMARY OF THE INVENTION

In the present invention, DLLs are used to provide remote manageability for applications. Each application that needs to be remotely managed provides a plug-in interface in the form of a DLL. The management client on the device loads the DLLs provided by applications installed on a wireless device and uses the interface to affect changes in the applications. Loading DLLs associated with applications enables the management client or management agent to control the applications.

Today's wireless data terminals are capable of supporting many applications that could be installed and add value to a wireless data device. These application categories include enterprise applications (email, salesforce automation etc.), security applications (anti-virus, encryption, firewall, etc.), financial applications (m-commerce, payment applications, etc.), to name a few. Once installed, they can be executed on the device but are not capable of being managed by a remote management server that can invoke application specific commands. One aspect of this invention is a client-plug-in interface that provides a simple set of commands for controlling and managing third party applications without requiring pre-configuration with application-specific commands.

The present invention provides a system and method for a remote management server to configure applications on mobile devices. According to the present invention, a common plug-in interface is provided for each application. The plug-in interface provides a well defined, simple set of commands for controlling third party applications. This invention describes the operation of this plug-in and the commands it provides to enable remote management of applications on mobile devices.

Another aspect of the invention is the use of one or more application specific dynamic link libraries that each implement a simple set of commands which the management agent loads. Dynamic link libraries are typically used to dynamically enhance the capability of the application by providing different capabilities in different DLLs. In this invention, DLLs are used to provide remote management capability. Each application that needs to be remotely managed provides a dynamic link library (DLL) and registers the application signature. Given the signature of the application that needs to be managed, the management agent loads the provided DLL and communicates with the application.

Yet another aspect of the invention includes a management agent on the device and a management server to remotely manage third party applications. The management server sends commands to the agent on the device that then invokes the corresponding methods in the DLL provided by the third party application. The management agent returns to the management server any status code that is part of a method executed by the application. Even though the set of configuration commands for each application may vary, the management client uses a common method to pass any command that is sent by the remote management server.

One aspect of the present invention is a method for remotely managing applications on a mobile wireless device using a management server and a management agent, including providing a dynamic link library for each application to be managed, loading the dynamic link library in the management agent, receiving a command for managing a specific application by the management agent from the management server, invoking the command through the dynamic link library, and sending a status of command execution to the management server through the management agent.

In a further embodiment, an additional aspect of receiving commands for managing a specific application includes receiving a command to start an application by the management agent from the management server and starting the application.

In an alternative embodiment, an additional aspect of receiving commands for managing a specific application includes receiving a command to stop an application by the management agent from the management server and stopping the application.

In an alternative embodiment, an additional aspect of receiving commands for managing a specific application includes receiving an invoke command and an application signature by the management agent from the management server, determining the correct application to send a command to by the application signature, and invoking an operation in the application.

In an alternative embodiment, the method has an additional step of providing a common directory on the mobile device for storing one or more plug-in interfaces as dynamic link libraries.

In an additional alternative embodiment, the method has additional steps of storing credentials of the remote management server with the management agent and verifying that the credentials are correct prior to invoking any commands from the management server.

In an additional alternative embodiment, the method has additional steps of registering a unique signature with the management server for each application that can be remotely managed and associating each application with a signature.

In an alternative embodiment, an additional aspect of receiving commands for managing a specific application includes receiving an unload command and an application signature by the management agent from the management server, determining the correct application to send a command to from the application signature, and relinquishing the ability to control the application by removing the application dynamic link library from the memory of the management agent.

In an additional alternative embodiment, the method has additional steps of transferring the dynamic link library of an application from the management server to the mobile wireless device and installing the dynamic link library on the mobile wireless device.

In another aspect of the invention, a system is provided for remotely managing applications on mobile wireless devices using a management agent, including a management server located on a network, a processor operable to execute computer program instructions, an adapter operable for communicating with the network, an interface capable of accepting user input, and software for loading into the management agent a dynamic link library for each application to be managed, receiving a command for managing a specific application by the management agent from the management server; invoking the command through the dynamic link library, and sending a status of command execution to the management server through the management agent.

In an alternative embodiment, the software function of receiving commands for managing a specific application includes receiving a command to start an application by the management agent from the management server and starting the application.

In an alternative embodiment, the software function of receiving commands for managing a specific application includes receiving a command to stop an application by the management agent from the management server and stopping the application.

In an alternative embodiment, the software function of receiving commands for managing a specific application includes receiving an invoke command and an application signature by the management agent from the management server, determining the correct application to send a command to by the application signature, and invoking an operation in the application.

In an additional embodiment, the system includes a common directory on the mobile device for storing one or more plug-in interfaces as dynamic link libraries.

In an alternative embodiment, the software on the system stores credentials of the remote management server with the management agent and verifies that the credentials are correct prior to invoking any commands from the management server.

In an alternative embodiment, the software on the system registers a unique signature with the management server for each application that can be remotely managed and associates each application with a signature.

In an alternative embodiment, the software function of receiving commands for managing a specific application includes receiving an unload command and an application signature by the management agent from the management server, determining the correct application to send a command to from the application signature, and relinquishing the ability to control the application by removing the application dynamic link library from the memory of the management agent.

In an alternative embodiment, the software on the system transfers the dynamic link library of an application from the management server to the mobile wireless device and installs the dynamic link library on the mobile wireless device.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION OF THE INVENTION

A Dynamic Link Library (DLL) is a collection of sub-routines or procedures that is loaded at run-time by a main program to add additional functionality. By loading the library as needed or at run-time, the main program can optimize on the space needed as compared to statically loading all the libraries. Thus, by calling different DLLs at run-time, an application's capability can be extended.

The present invention provides a mechanism by which a management server deployed in wireless communication system can provide application management. Applications that execute on wireless devices may be remotely managed by a management server. Management operations include remotely starting an application on a wireless device, and stopping an application that is running on a wireless device. Other operations include remotely invoking any operation provided by an application that is running on wireless device.

Each application has its own set of operations and configuration parameters. Even for similar operations different application vendors will choose to implement the operations in different ways and also name the operations in different ways. A management server needs a common interface through which it can invoke any command provided by the application. Any command or operation for a given application can simply be passed as a parameter using the common interface. The set of methods exposed in the common interface is the only set that is known to the management server for purposes of sending commands to mobile devices. The present invention provides a method by which a DLL is installed for each application that can be remotely managed. These DLLs may be provided in a common management folder on the mobile device. The management folder may be added or installed on the mobile device, or may be selected from pre-existing folders already present on the mobile device, including the default or root directory, among others.

Figure 1:
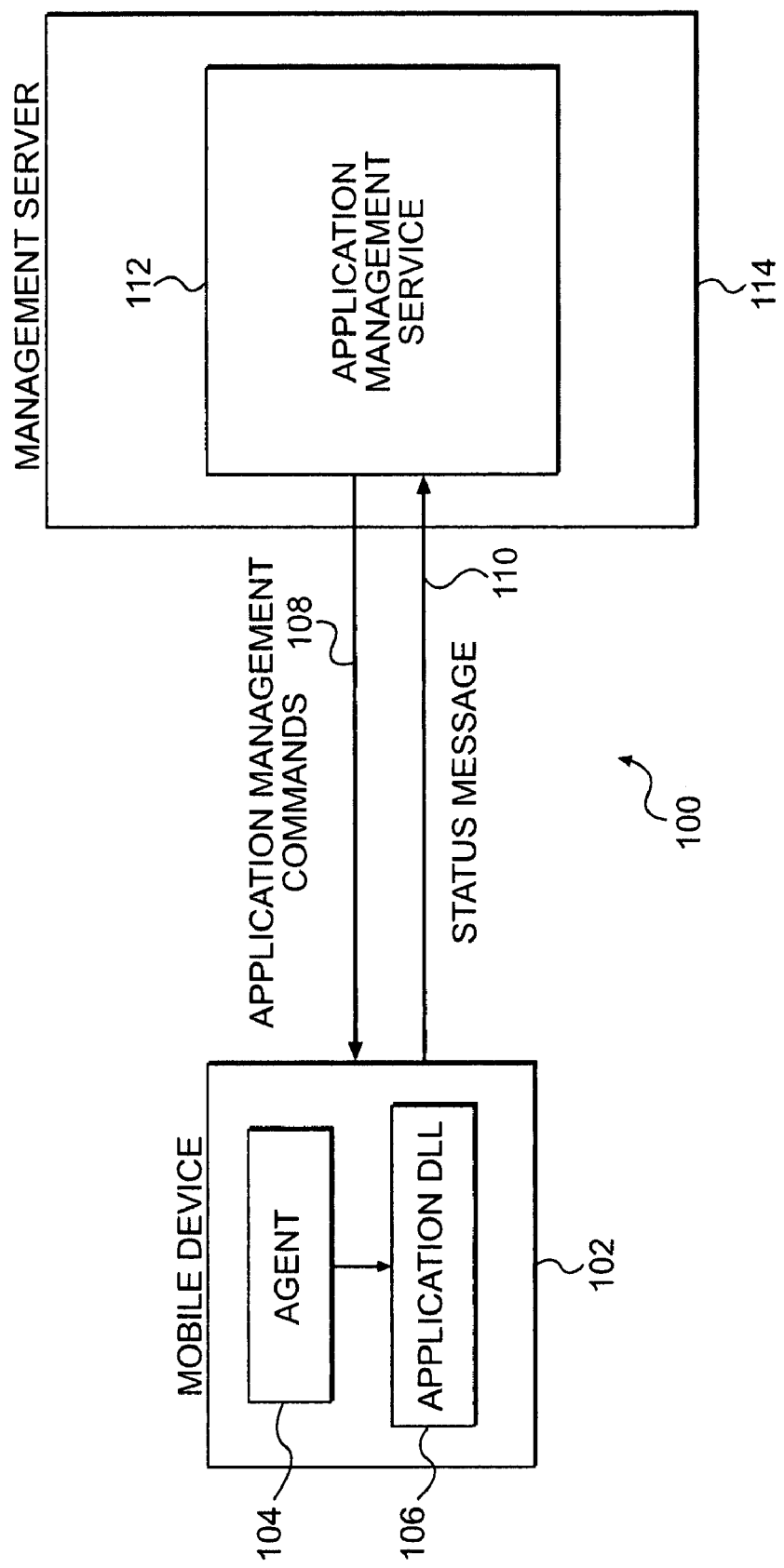
FIG. 1 is an exemplary flow diagram of a process for managing an application with a management server through a management agent via a DLL.

An exemplary flow diagram of a process 100 for managing an application with a management server through a management agent via a DLL is shown in FIG. 1. An application management service 112 running on management server 114 sends commands meant for a remotely managed application on a specific mobile device 102. Mobile device 102 may be any type of wireless device, such as a wireless telephone, personal digital assistant (PDA), mobile email device, wireless terminal, laptop, etc. Management server 114 is typically a server system that is used by manage the services provided by and to wireless (and other) devices, but may be any type of computer system capable of performing the necessary functions, such as that shown in FIG. 5.

Communications over the air (OTA) may be transmitted over a cellular telephone network, wireless data network, or between devices. Communications over the air may be transmitted in any wireless format for example, a format used by mobile telephone networks, BlueTooth, or infrared. Communications sent OTA may be transmitted via or more wireless networks and/or one or more wireline networks. Communications may also be sent to wireless devices that have the capability through cables. The transmission media in a wireless network is typically electromagnetic radiation, such as radio waves or light, while the transmission media in a wireline network is wire, such as copper wire, or the equivalent of wire, such as fiber optic cable. The wireless telecommunications networks included in the telecommunications network may include, for example, digital cellular telephone networks, such as Global System for Mobile Telecommunications (GSM) networks, Personal Communication System (PCS) networks, etc. The wireline telecommunications networks included in the telecommunications network may include, for example, the Public Switched Telephone Network (PSTN), as well as proprietary local and long distance telecommunications networks; these may be accessed by wireless devices directly or through the wireless network. In addition, the telecommunications network may include digital data networks, such as one or more local area networks (LANs), one or more wide area networks (WANs), or both LANs and WANs. These networks may utilize any networking technology and protocol, such as Ethernet, Token Ring, Transmission Control Protocol/Internet Protocol (TCP/IP), etc.

The management agent 104 on the wireless device 102 will only run the commands 108 sent by the management server after verifying that it is an authorized server. The criteria for establishing the validity of the credentials of the server will have been stored with the installation of the management agent (or subsequently updated).

For each of the applications that may be remotely managed, the management agent will use the specific application dynamic link library (DLL) 106 provided by that application in order to invoke commands 108 to be executed in the application. The execution of these commands may result in some action in the application or in a related application. A status message 110 reflecting that the command has been invoked, as well as results, if any, that may be returned by the application, are communicated by the management agent 104 back to the application management service 112 on management server 114, if a response is expected.

Figure 2:
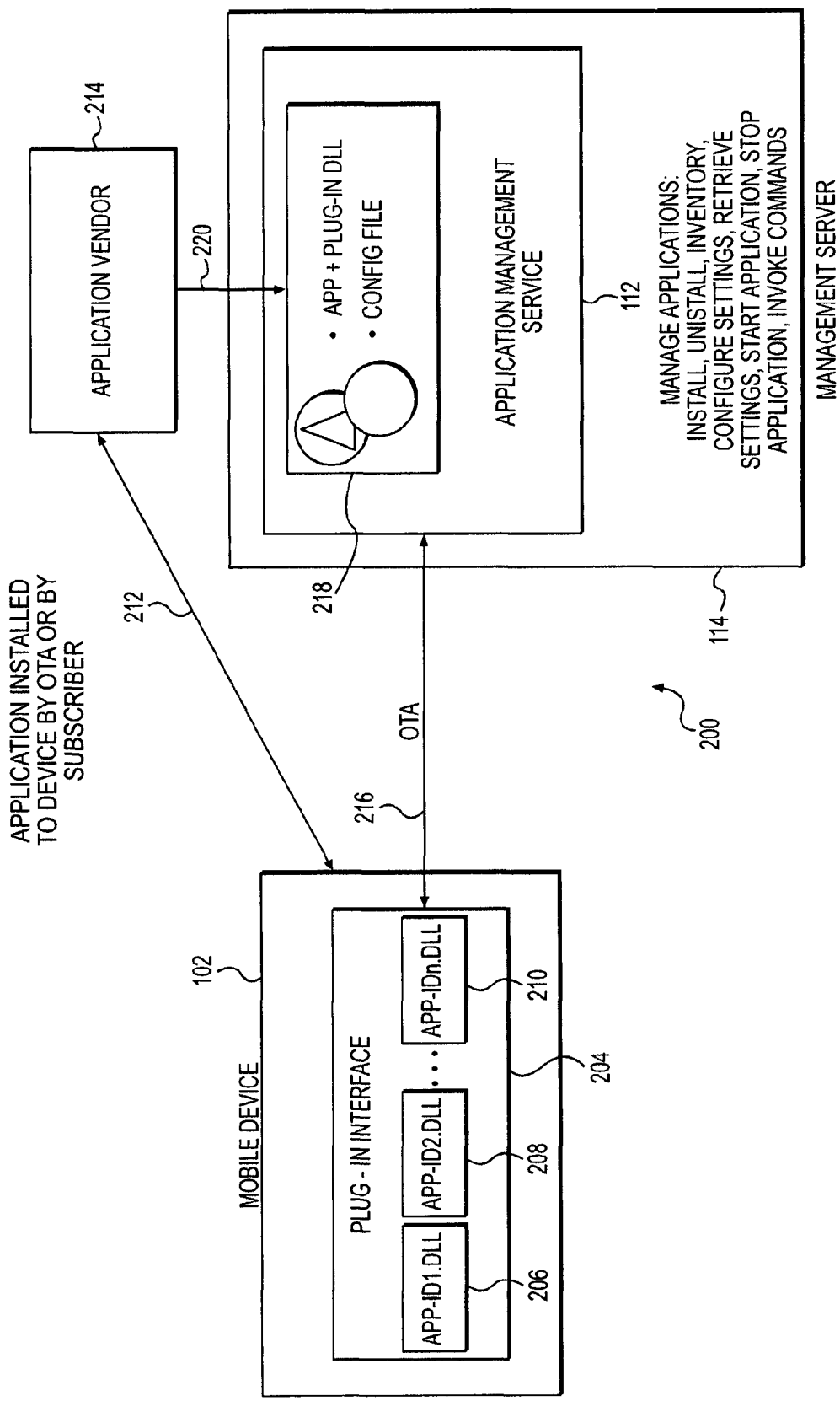
FIG. 2 is an illustrative diagram of a system in which the present invention may be implemented.

An exemplary diagram of a system and method 200 by which application DLLs may be downloaded and installed onto a mobile device 102 and used by a management server 114 to manage applications is shown in FIG. 2. A DLL, for example, one of application DLLs 206, 208, and 210, can be loaded onto the mobile device 102 as a part of plug-in interface 204 either when the application associated with the DLL is installed, or a DLL 218 can be downloaded later by the management server 114 to the device over the air (OTA) 216. The application management service 112 may, for example, be prompted by management server 114 to send the DLL 218 to the device 102 as the result of a policy setting on the management server 114, or the service 112 may request an inventory of the applications on the device 102 and push the DLLs 206, 208, or 210 for applications installed on the device that have missing or outdated DLLs. In an alternative embodiment, the mobile device 102 may request the management server 114 to send a DLL 218 for a specific application, or to send DLLs for one or more applications already installed.

Third party application developers or vendors 214 may implement and publish application-specific DLLs according to the management agent's described plug-in interface 204. For example, application vendors 214 who wish to enable their applications to be remotely managed may provide 220 the DLL 218, optionally with a configuration file, to the management server 114. The optional configuration file may be an XML, for example, or other file format, sent by the application vendor 214 to be processed by the application associated with the accompanying DLL 218. The DLLs and optional configuration files 218 provided by application vendors 214 can then be loaded into the management server 114 and then installed in a common management folder on the wireless devices such as device 102. The management server 114 may install the DLL on the wireless terminal 102 over the air 216 using any wireless communication protocol.

Alternatively, application vendor 214 may provide application-specific DLLs for download by subscriber or by automatic push 212 directly to mobile device 102, bypassing the management server 114 for the purposes of the download. This download or push 212 may be accomplished through a wireless connection such as cellular, BlueTooth, or infrared communication, or may be accomplished by a wired connection such as serial, USB, or Ethernet cable, for example.

Figure 3:
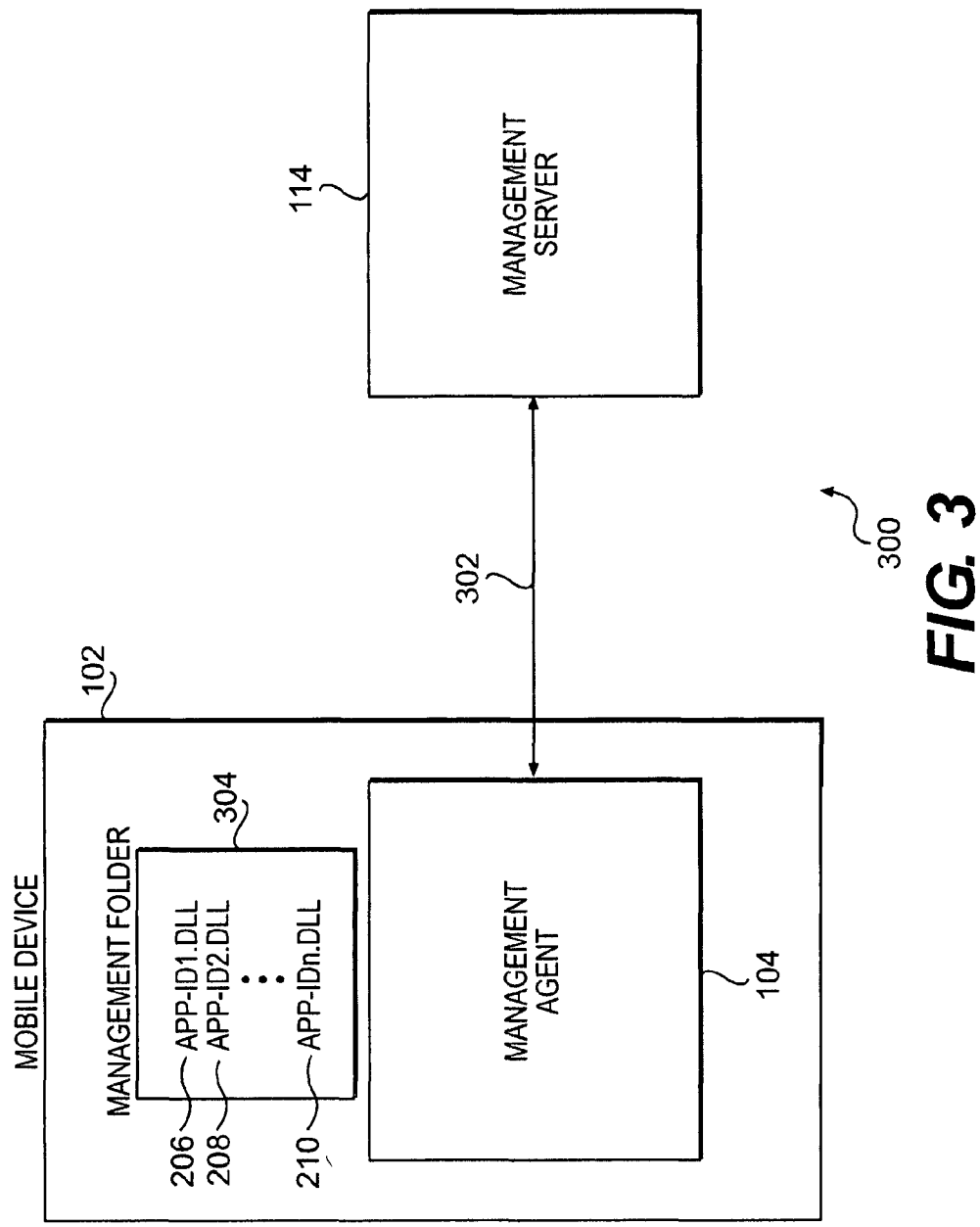
FIG. 3 is an illustrative diagram of selected elements of a system in which the present invention may be implemented.

FIG. 3 is block diagram representative of the method by which dynamic link libraries are stored in a common management folder 304. The management agent 104 loads each of the application DLLs 206, 208, and 210, when it is first started on the mobile device 102. The management agent 104 may invoke commands sent by the server 114 by using the DLLs. The application DLLs 206, 208, and 210 can be loaded onto the mobile device 102 in the management folder 304 either when the associated application is installed or can downloaded by the management server 114 to the device over the air (OTA) as described in FIG. 2. The common management folder 304 where the DLLs shall reside may be designated by the management server 304.

Each application capable of being managed remotely will have a specific DLL 206-210 associated with it. Once the DLLs are installed on the mobile device 102, the management agent 104 loads the DLLs 206-210 each time the agent 104 is started. When instructed by the management server 114, the management agent 104 running on the mobile device 104 invokes commands for specific applications using the DLL specific to each application.

Figure 4:
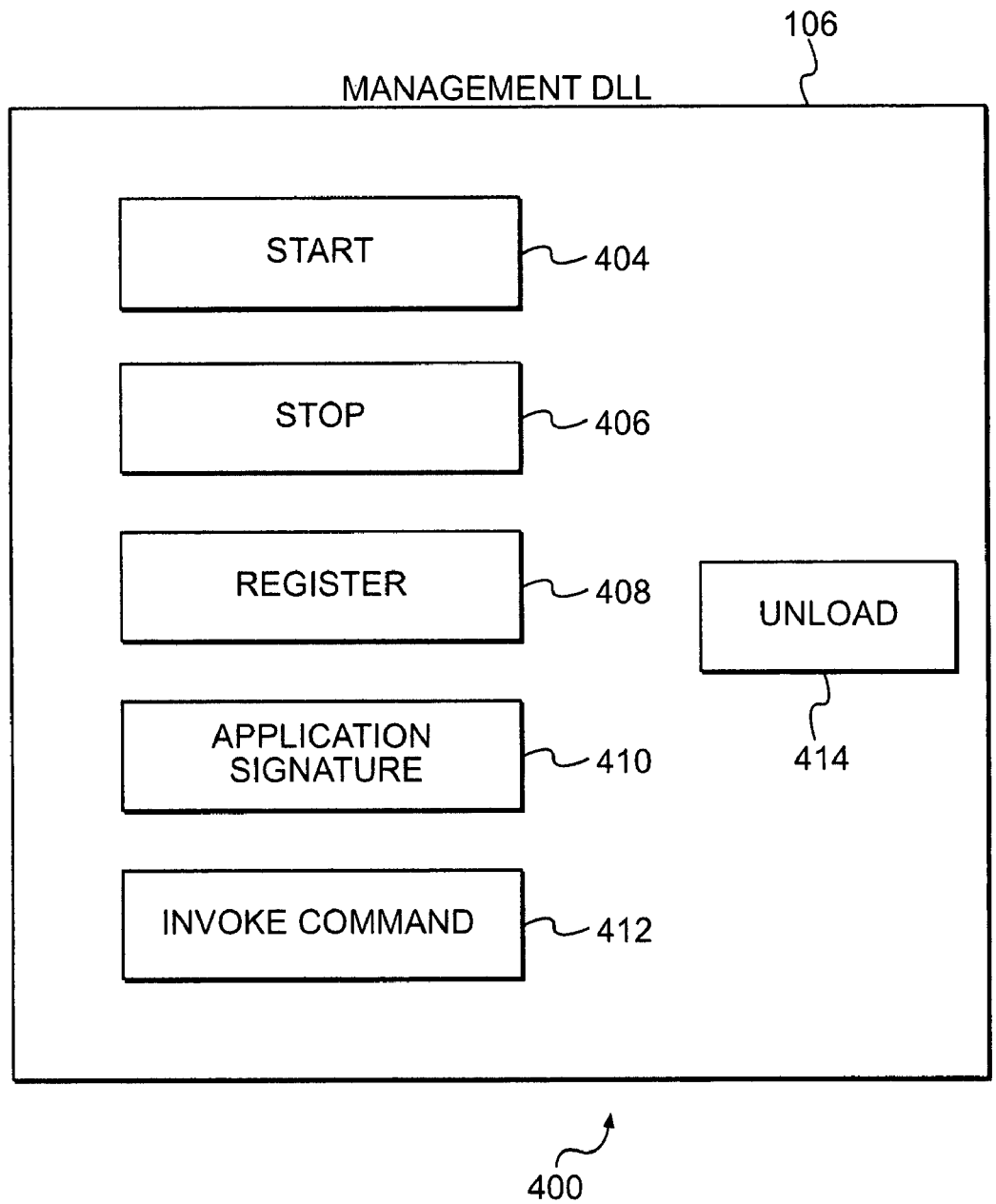
FIG. 4 is an exemplary block diagram that shows commands available to manage applications that can be remotely managed.

FIG. 4 illustrates the common interface in each application management DLL 106 for remote management Examples of methods exposed in the plug-in interface include: 1) start 404, 2) stop 406, 3) register 408, 4) application signature 410, 5) invoke-command 412, and 6) unload 414. Although these examples are described below other commands may be available within the common plug-in interface.

The application signature 410 identifies the particular application that is being remotely managed. A signature command 410 may be run to associate an application with a DLL 106, or the DLL 106 may have a signature associated with it on installation. To remotely manage an application, the management server will send a command to the management agent, where one parameter of the command is a signature that uniquely identifies which application is to be remotely managed.

The start command 404 is to start the application and begin its execution. The stop method 406 is used to stop the application. The application may be stopped by killing or closing the application, or by whatever means is available on the device for stopping an application. The register command 408 establishes the communication interface with the management agent 104 shown in FIG. 1.

The invoke command 412 may be used to push a command to the application. The unload command 414 relinquishes control of the application from the management agent by unloading the DLL specific to the application from the management agent 104. After the DLL 106 for a specific application is unloaded from the management agent 104, the application may still be present on the device 102, in either a running or stopped state, but the management server 114 will no longer be able to remotely manage the application on the mobile device 102 through the management agent 104.

A generic command such as invoke-command 412 passes any application specific command as a parameter. For example, to invoke a remote scan of an anti-virus application, the management server 114 issues a invoke-command(scan, Anti-virus-application-signature) 412 to the management agent 104 which then passes the command to the said Anti-virus application using the DLL 106. The application then parses the command and executes the scan method implemented by the AV application. The availability of a generic invoke command 412 shields the management client 104 from the idiosyncrasies of each application's control interface.

Figure 5:
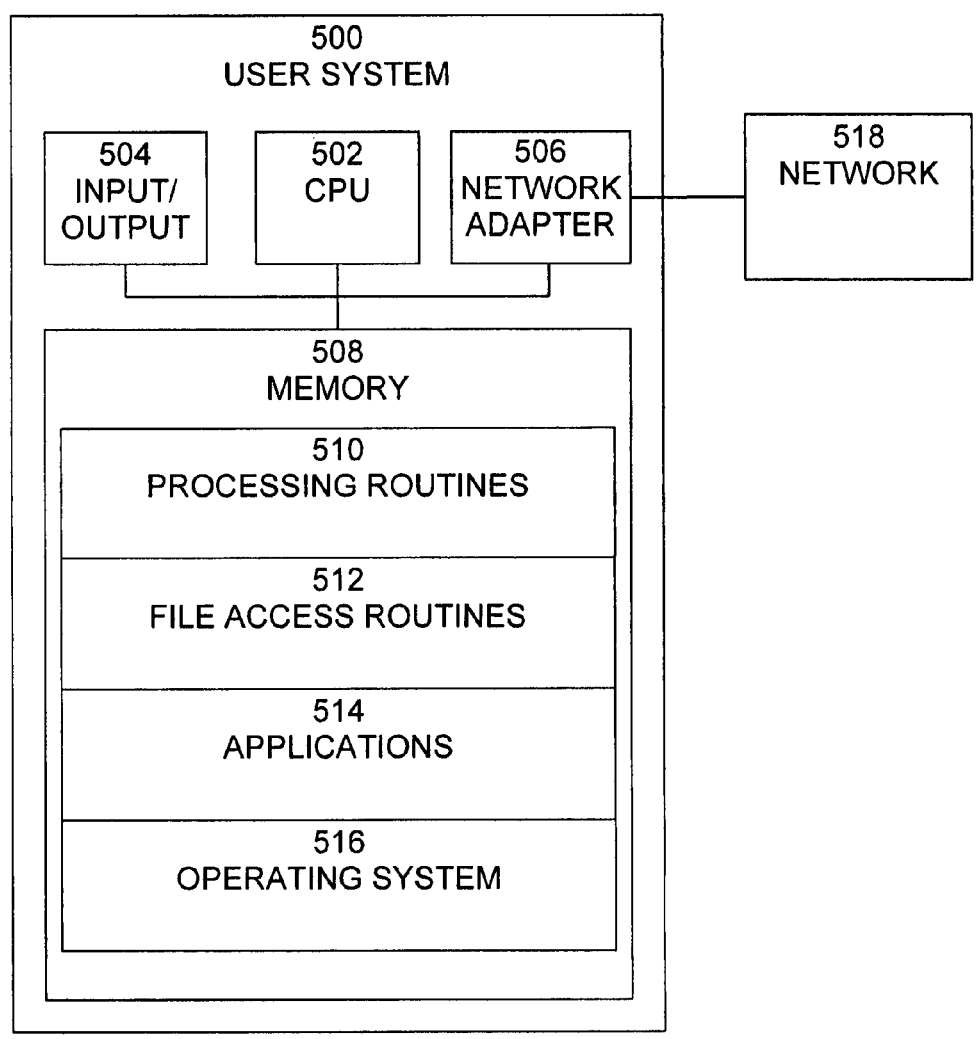
FIG. 5 is an exemplary block diagram of a management server shown in FIG. 1.

A block diagram of an exemplary user system 500, in which the present invention may be implemented, is shown in FIG. 5. User system 500 is typically a programmed general-purpose computer system, such as a personal computer, workstation, server system, and minicomputer or mainframe computer. User system 500 includes processor (CPU) 502, input/output circuitry 504, network adapter 506, and memory 508. CPU 502 executes program instructions in order to carry out the functions of the present invention. Typically, CPU 502 is a microprocessor, such as an INTEL PENTIUM® processor, but may also be a minicomputer or mainframe computer processor. Although in the example shown in FIG. 5, user system 500 is a single processor computer system, the present invention contemplates implementation on a system or systems that provide multi-processor, multi-tasking, multi-process, multi-thread computing, distributed computing, and/or networked computing, as well as implementation on systems that provide only single processor, single thread computing. Likewise, the present invention also contemplates embodiments that utilize a distributed implementation, in which user system 500 is implemented on a plurality of networked computer systems, which may be single-processor computer systems, multi-processor computer systems, or a mix thereof.

Input/output circuitry 504 provides the capability to input data to, or output data from, user system 500. For example, input/output circuitry may include input devices, such as keyboards, mice, touchpads, trackballs, scanners, etc., output devices, such as video adapters, monitors, printers, etc., and input/output devices, such as, modems, etc. Network adapter 506 interfaces user system 500 with Internet/intranet 518. Internet/intranet 518 may include one or more standard local area network (LAN) or wide area network (WAN), such as Ethernet, Token Ring, the Internet, or a private or proprietary LAN/WAN.

Memory 508 stores program instructions that are executed by, and data that are used and processed by, CPU 502 to perform the functions of user system 500. Memory 508 typically includes electronic memory devices, such as random-access memory (RAM), which are capable of high-speed read and write operations providing direct access by the CPU 502. Additional memory devices included in user system 500 may include read-only memory (ROM), programmable read-only memory (PROM), electrically erasable programmable read-only memory (EEPROM), flash memory, electromechanical memory, magnetic disk drives, hard disk drives, floppy disk drives, tape drives, optical disk drives, etc.

Memory 508 includes processing routines 510, file access routines 512, applications 514, and operating system 516. File access routines 514 include software that provides access to files stored on local file storage and remote storage. Applications 514 include software used to perform other functions on user system 500. Operating system 516 provides overall system functionality.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as floppy disc, a hard disk drive, RAM, and CD-ROM's, as well as transmission-type media, such as digital and analog communications links.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method for remotely managing applications on a mobile wireless device using a management server and a management agent, the method comprising:
   providing a dynamic link library for each application to be managed;
   loading the dynamic link library in the management agent;
   receiving a command for managing a specific application by the management agent from the management server;
   invoking the command through the dynamic link library;
   sending a status of command execution to the management server through the management agent;
   receiving an unload command and an application signature by the management agent from the management server;
   determining the correct application to send a command to from the application signature; and
   relinquishing the ability to control the application by removing the application dynamic link library from the memory of the management agent.

2. The method of claim 1, wherein receiving commands for managing a specific application further comprises:
   receiving a command to start an application by the management agent from the management server and starting the application.

3. The method of claim 1, wherein receiving commands for managing a specific application further comprises:
   receiving a command to stop an application by the management agent from the management server and stopping the application.

4. The method of claim 1, wherein receiving commands for managing a specific application further comprises:
   receiving an invoke command and an application signature by the management agent from the management server;
   determining the correct application to send a command to by the application signature; and
   invoking an operation in the application.

5. The method of claim 1, further comprising:
   providing a common directory on the mobile device for storing one or more plug-in interfaces as dynamic link libraries.

6. The method of claim 1, further comprising:
   storing credentials of the remote management server with the management agent; and
   verifying that the credentials are correct prior to invoking any commands from the management server.

7. The method of claim 1, further comprising:
   registering a unique signature with the management server for each application that can be remotely managed; and
   associating each application with a signature.

8. The method of claim 1, further comprising:
   transferring the dynamic link library of an application from the management server to the mobile wireless device; and
   installing the dynamic link library on the mobile wireless device.

9. A system for remotely managing applications on mobile wireless devices using a management agent, comprising:
   a management server located on a network,
   a processor operable to execute computer program instructions,
   an adapter operable for communicating with the network,
   an interface capable of accepting user input,
   software operational on the wireless device for:
   loading into the management agent a dynamic link library for each application to be managed;
   receiving a command for managing a specific application by the management agent from the management server;
   invoking the command through the dynamic link library;
   sending a status of command execution to the management server through the management agent;
   receiving an unload command and an application signature by the management agent from the management server;
   determining the correct application to send a command to from the application signature; and
   relinquishing the ability to control the application by removing the application dynamic link library from the memory of the management agent.

10. The system of claim 9, wherein receiving commands for managing a specific application further comprises:
    receiving a command to start an application by the management agent from the management server and starting the application.

11. The system of claim 9, wherein receiving commands for managing a specific application further comprises:
    receiving a command to stop an application by the management agent from the management server and stopping the application.

12. The system of claim 9, wherein receiving commands for managing a specific application further comprises:
    receiving an invoke command and an application signature by the management agent from the management server;
    determining the correct application to send a command to by the application signature; and
    invoking an operation in the application.

13. The system of claim 9, further comprising: a common directory on the mobile device for storing one or more plug-in interfaces as dynamic link libraries.

14. The system of claim 9, further comprising the software:
    storing credentials of the remote management server with the management agent; and
    verifying that the credentials are correct prior to invoking any commands from the management server.

15. The system of claim 9, further comprising the software:
    registering a unique signature with the management server for each application that can be remotely managed; and
    associating each application with a signature.

16. The system of claim 9, further comprising the software:
    transferring the dynamic link library of an application from the management server to the mobile wireless device; and
    installing the dynamic link library on the mobile wireless device.

17. A non-transitory computer readable storage medium for remotely managing applications on a mobile wireless device using a management server and a management agent comprising:
    computer program instructions, recorded on the non-transitory computer readable storage medium and executable by a processor, for:
    providing a dynamic link library for each application to be managed;
    loading the dynamic link library in the management agent;
    receiving a command for managing a specific application by the management agent from the management server;
    invoking the command through the dynamic link library;
    sending a status of command execution to the management server through the management agent;
    receiving an unload command and an application signature by the management agent from the management server;

determining the correct application to send a command to from the application signature; and relinquishing the ability to control the application by removing the application dynamic link library from the memory of the management agent.

18. The non-transitory computer readable storage medium of claim 17, wherein receiving commands for managing a specific application further comprises:

receiving a command to start an application by the management agent from the management server and starting the application.

19. The non-transitory computer readable storage medium of claim 17, wherein receiving commands for managing a specific application further comprises:

receiving a command to stop an application by the management agent from the management server and stopping the application.

20. The non-transitory computer readable storage medium of claim 17, wherein receiving commands for managing a specific application further comprises:

receiving an invoke command and an application signature by the management agent from the management server;

determining the correct application to send a command to by the application signature; and invoking an operation in the application.

21. The non-transitory computer readable storage medium of claim 17, further comprising:

providing a common directory on the mobile device for storing one or more plug-in interfaces as dynamic link libraries.

22. The non-transitory computer readable storage medium of claim 17, further comprising:

storing credentials of the remote management server with the management agent; and verifying that the credentials are correct prior to invoking any commands from the management server.

23. The non-transitory computer readable storage medium of claim 17, further comprising:

registering a unique signature with the management server for each application that can be remotely managed; and associating each application with a signature.

24. The non-transitory computer readable storage medium of claim 17, further comprising:

transferring the dynamic link library of an application from the management server to the mobile wireless device; and installing the dynamic link library on the mobile wireless device.

* * * * *